(12) United States Patent
Wu

(10) Patent No.: US 7,175,288 B2
(45) Date of Patent: Feb. 13, 2007

(54) PROJECTOR

(75) Inventor: Tsung-Hsun Wu, Taoyuan (TW)

(73) Assignee: Benq Corporation, Taoyuan Shien (TW)

( * ) Notice: Subject to any disclaimer, the term of this patent is extended or adjusted under 35 U.S.C. 154(b) by 89 days.

(21) Appl. No.: 10/881,184

(22) Filed: Jun. 30, 2004

(65) Prior Publication Data
US 2005/0001996 A1    Jan. 6, 2005

(30) Foreign Application Priority Data
Jul. 4, 2003    (TW) ................ 92118428 A

(51) Int. Cl.
G03B 21/28    (2006.01)
(52) U.S. Cl. ............. 353/98; 353/84; 353/85; 348/743; 348/771
(58) Field of Classification Search ............ 353/85, 353/122, 31; 349/5, 7; 348/742, 743, 771
See application file for complete search history.

(56) References Cited

U.S. PATENT DOCUMENTS

| 6,147,720 | A * | 11/2000 | Guerinot et al. ........... 348/744 |
| 6,642,969 | B2 * | 11/2003 | Tew ........................... 348/743 |
| 6,643,069 | B2 * | 11/2003 | Dewald ...................... 359/629 |
| 6,698,898 | B2 * | 3/2004 | Terami et al. ............... 353/52 |
| 6,709,111 | B2 * | 3/2004 | Hirao et al. ................. 353/52 |
| 6,710,762 | B1 * | 3/2004 | Hasegawa .................. 345/101 |
| 6,802,615 | B2 * | 10/2004 | Okada .......................... 353/85 |
| 6,824,275 | B2 * | 11/2004 | Penn ............................ 353/81 |
| 6,886,942 | B2 * | 5/2005 | Okada et al. ................. 353/52 |
| 2003/0184572 | A1* | 10/2003 | Kaise .......................... 345/698 |
| 2005/0151933 | A1* | 7/2005 | Tsai et al. .................... 353/57 |
| 2005/0151937 | A1* | 7/2005 | Sugitani ...................... 353/85 |

FOREIGN PATENT DOCUMENTS

| TW | 332876 | 9/1985 |
| TW | 413753 | 7/1986 |
| TW | 525157 | 3/2003 |

* cited by examiner

Primary Examiner—William C. Dowling
(74) Attorney, Agent, or Firm—Thomas, Kayden, Horstemeyer & Risley

(57) ABSTRACT

A projector includes a lamp, a ballast, a micro controller unit and an optical engine. The lamp emits a light ray. The ballast starts the lamp and selectively outputs an operating power and a blanking power to the lamp. The micro controller unit controls the ballast. The optical engine receives the light ray and outputs a projecting image to a screen outside the projector. When the projector enters a blanking mode from a normal operating mode, the micro controller unit outputs a control signal to the ballast, and the power supplied from the ballast to the lamp is changed from the operating power to the blanking power.

6 Claims, 2 Drawing Sheets

PROJECTOR

This application claims the benefit of Taiwan application Ser. No. 092118428, filed Jul. 4, 2003, the subject matter of which is incorporated herein by reference.

BACKGROUND OF THE INVENTION

1. Field of the Invention

The invention relates to a projector, and more particularly to a projector with reduced power of an emitting lamp in a blanking mode.

2. Description of the Related Art

The conventional digital light processing (DLP) projector includes a lamp, an optical engine and a lens. The optical engine has a digital micro-mirror device (DMD), multiple reflective devices, a color wheel and a light pipe. The lamp emits a light ray. The light ray emitted from the lamp passes through the color wheel, which generates at least three primary-color light rays. The three primary-color light rays are conducted by the light pipe, and then enter the reflective devices. Thereafter, the three primary-color light rays reflected from the reflective devices are incident to the DMD. When the projector is in a normal mode, the three primary-color light rays are reflected by the DMD and pass through the lens, and then a projecting image is projected onto a screen outside the projector.

In general, the projector further has a blanking mode in addition to the above-mentioned normal mode. Since the lamp of the projector is a high brightness bulb set, the lamp cannot be immediately turned on of off because a predetermined period of time is required to either preheat after the lamp is turned on, or dissipate heat after the lamp is turned off. Consequently, the lamp of the projector is designed to have a blanking mode, in which the projector temporarily stops outputting the projecting image onto the screen. When the projector is in the blanking mode, no image is displayed on the screen. The operation of the conventional DLP projector in the blanking mode is such that all of the incident light rays to the DMD are reflected to an inner wall of the optical engine without being projecting out of the DLP projector by rotating the mirror angles of the micro-mirrors of the DMD.

However, when the DLP projector is in the blanking mode, all of the light rays are reflected from the DMD to the inner wall of the optical engine, thereby causing an overheating condition in the optical engine. Since the optical engine is a closed chamber and the light rays are reflected multiple times in the closed chamber after they are reflected by the inner wall, the temperature of the optical engine sequentially rises and the energy is thus wasted.

In addition, the problem of overheating of the optical engine also may occur in the blanking mode in the conventional transmittive LCD projector. In the blanking mode, the ploarizer of the LCD (liquid crystal display) panel blocks all of the light rays, and the temperature of the LCD projector keeps on rising accordingly. When the temperature of the DLP projector or LCD projector is too high, error operations will be caused or even the elements will be burn out. Consequently, it is quite necessary to provide a projector capable of solving the problems of overheating and energy wasting.

SUMMARY OF THE INVENTION

It is therefore an object of the invention to provide a projector having a ballast, which is controlled such that the output power of a lamp of the projector is reduced when the projector enters a blanking mode. Thus, the problems of overheating and energy wasting may be properly solved.

The invention achieves the above-identified object by providing a projector including a lamp, a ballast, a micro controller unit and an optical engine. The lamp emits a light ray. The ballast starts the lamp and selectively supplies an operating power and a blanking power to the lamp. The micro controller unit controls the ballast. The optical engine receives the light ray and outputs a projecting image to a screen outside the projector. When the projector enters a blanking mode from a normal operating mode, the micro controller unit outputs a control signal to the ballast, and the power supplied from the ballast to the lamp is changed from the operating power to the blanking power.

The invention also achieves the above-identified object by providing a digital light processing projector including a switch, a lamp, a ballast, a micro controller unit and an optical engine. The lamp emits a light ray. The ballast starts the lamp and supplies a power to the lamp. The micro controller unit is coupled to the switch to control the ballast. The optical engine receives the light ray and outputs a projecting image to a screen outside the projector. The optical engine has a digital micro-mirror device (DMD), and the light ray emitted from the lamp is incident to the DMD. When the projector is in a normal mode, the light ray is reflected by the DMD and projected onto the screen. When the switch is triggered, the projector enters a blanking mode, and the DMD reflects the light ray to an inner wall of the optical engine. The ballast reduces the output power of the lamp.

Other objects, features, and advantages of the invention will become apparent from the following detailed description of the preferred but non-limiting embodiments. The following description is made with reference to the accompanying drawings.

DETAILED DESCRIPTION OF THE INVENTION

The spirit of the invention resides in that when the projector is switched into a blanking mode, a micro controller unit (MCU) inside the projector will be triggered to control a ballast to reduce the output power of a lamp of the projector. After the power of the lamp is reduced, the optical energy projected from the DMD to the inner wall of the optical engine or the light blocked by the ploarizer is also reduced. Thus, the problems of overheating and energy wasting may be properly solved.

First Embodiment

Figure 1:
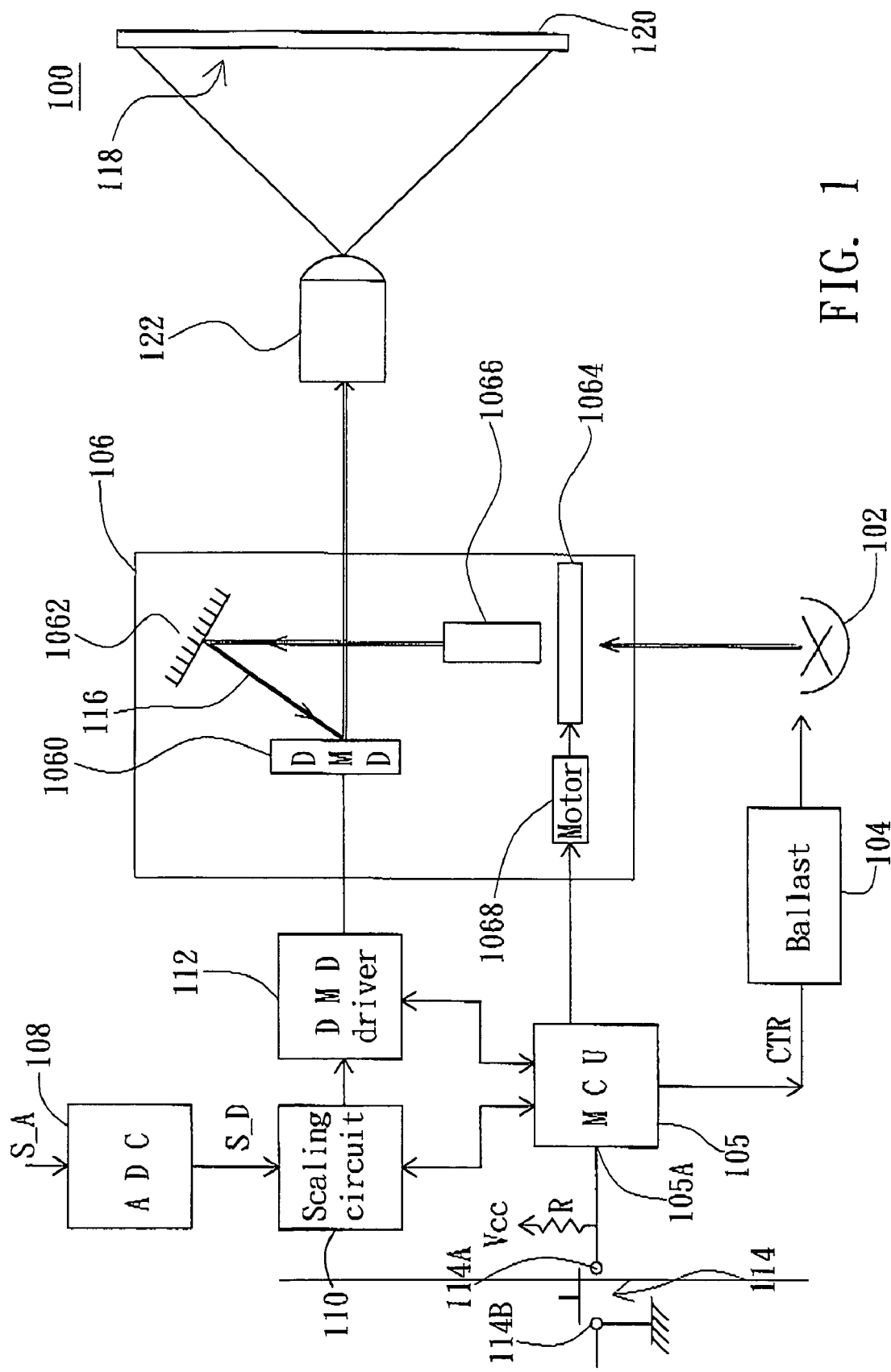
FIG. 1 is a system architecture diagram showing a digital light processing (DLP) projector according to a first embodiment of the invention.

FIG. 1 is a system architecture diagram showing a digital light processing (DLP) projector 100 according to a first embodiment of the invention. The DLP projector includes a lamp 102, a ballast 104, a micro controller unit 105, an optical engine 106, an analog-to-digital converter (ADC) 108, a scaling circuit 110, a DMD driver 112, a switch 114 and a lens 122. The optical engine 106 includes a DMD 1060, multiple reflective devices such as reflecting mirrors 1062, a color wheel 1064, and a light pipe 1066.

The ADC 108 converts an analog image signal S_A into a digital image signal S_D. The scaling circuit 110 processes the digital image signal S_D to make the digital image signal S_D satisfy the image resolution for the DLP projector 100. The DMD driver 112 receives the digital image signal S_D processed by the scaling circuit 110, and controls the DMD 1060 according to the digital image signal S_D.

The lamp 102 emits a light ray 116. The ballast 104 starts the lamp 102 and selectively supplies an operating power and a blanking power to the lamp 102. The micro controller unit 105 controls the output power of the ballast 104. The optical engine 106 receives the light ray 116 and outputs a projecting image 118 to a screen 120 outside the DLP projector 100.

When the DLP projector 100 is normally operating in a normal mode, the ballast 104 supplies the operating power to the lamp 102. After the light ray 116 emitted from the lamp 102 is incident to the optical engine 106, the light ray 116 passes through the color wheel 1064, which is a typically a disk composed of red, green and blue sectors and is driven by a motor 1068 to rotate. After the light ray 116 passes through the color wheel 1064, light rays with three primary colors are generated in a time-sharing manner. The light ray is conducted by the light pipe 1066 and then incident to the reflecting mirror 1062. The reflecting mirror 1062 reflects the light ray, which is then incident to the DMD 1060. The DMD driver 112 controls the DMD 1060 according to the digital image signal S_D processed by the scaling circuit 110 so as to change the angles of the micro-mirrors in the DMD 1060. The light ray 116 incident to the DMD 1060 is reflected by the DMD 1060 and processed by the lens 122. Then, the projecting image 118 is generated and projected onto the screen 120.

When the DLP projector 100 enters a blanking mode from a normal operating mode, the micro controller unit 105 outputs a control signal CTR to the ballast 104. The power supplied from the ballast 104 to the lamp 102 is changed from the operating power to the blanking power. In the blanking mode, the DMD 1060 reflects the light ray 116, which is reflected from the reflecting mirror 1062, to the inner wall of the optical engine 106, and the light ray reflected form the DMD 1060 cannot enter the lens 122. At this time, no projecting image is presented on the screen 120. It is to be noted that the blanking power is smaller than the operating power. Meanwhile, the micro controller unit 105 also outputs another control signal to stop the motor 1068 and thus the rotation of the color wheel 1064, thereby reducing the noise and power consumption caused by the color wheel 1064.

For example, when the operating power equals to 200 watts, the blanking power may be 160 watts or even lower. When the DLP projector 100 of this embodiment enters the blanking mode, the ballast 104 controls the output power of the lamp 102 to be the smaller blanking power. So, when the DMD 1060 reflects the light ray 116 to the inner wall of the optical engine 106, the smaller blanking power will ease the temperature rising of the optical engine 106. Compared to the conventional projector, the projector of the embodiment is free from the overheating condition, so the possibility of error operations or burn-out elements in the projector of this embodiment is smaller than that in the conventional projector. Furthermore, the smaller blanking power used in the blanking mode of this embodiment may advantageously save the energy.

In addition, there are many methods for triggering the projector of this embodiment to enter the blanking mode. In this embodiment, a micro controller unit 105 triggered by a switch 114 is described as an example. The micro controller unit 105 has an input pin 105A, and the switch 114 has a first terminal 114A and a second terminal 114B. The input pin 105A is coupled to a first terminal of a resistor R, and a second terminal of the resistor R is coupled to a first level Vcc. The first terminal 114A of the switch 114 is coupled to the input pin 105A, and the second terminal 114B of the switch 114 is coupled to a second level such as a ground level.

When the switch 114 is not pressed yet, the first level Vcc is input to the input pin 105A of the micro controller unit 105 such that the DLP projector 100 is kept at the normal mode and the ballast 104 supplies the operating power to the lamp 102. When the user presses the switch 114, the switch 114 is triggered, and the first terminal 114A of the switch 114 is electrically connected to the second terminal 114B. At this time, a ground signal is input to the input pin 105A of the micro controller unit 105, and the micro controller unit 105 is triggered. The triggered micro controller unit 105 makes the DLP projector 100 enter the blanking mode, and outputs the control signal CTR to the ballast 104. The power of the lamp 102 provided by the ballast 104 is changed from the operating power to the lower blanking power.

Second Embodiment

Figure 2:
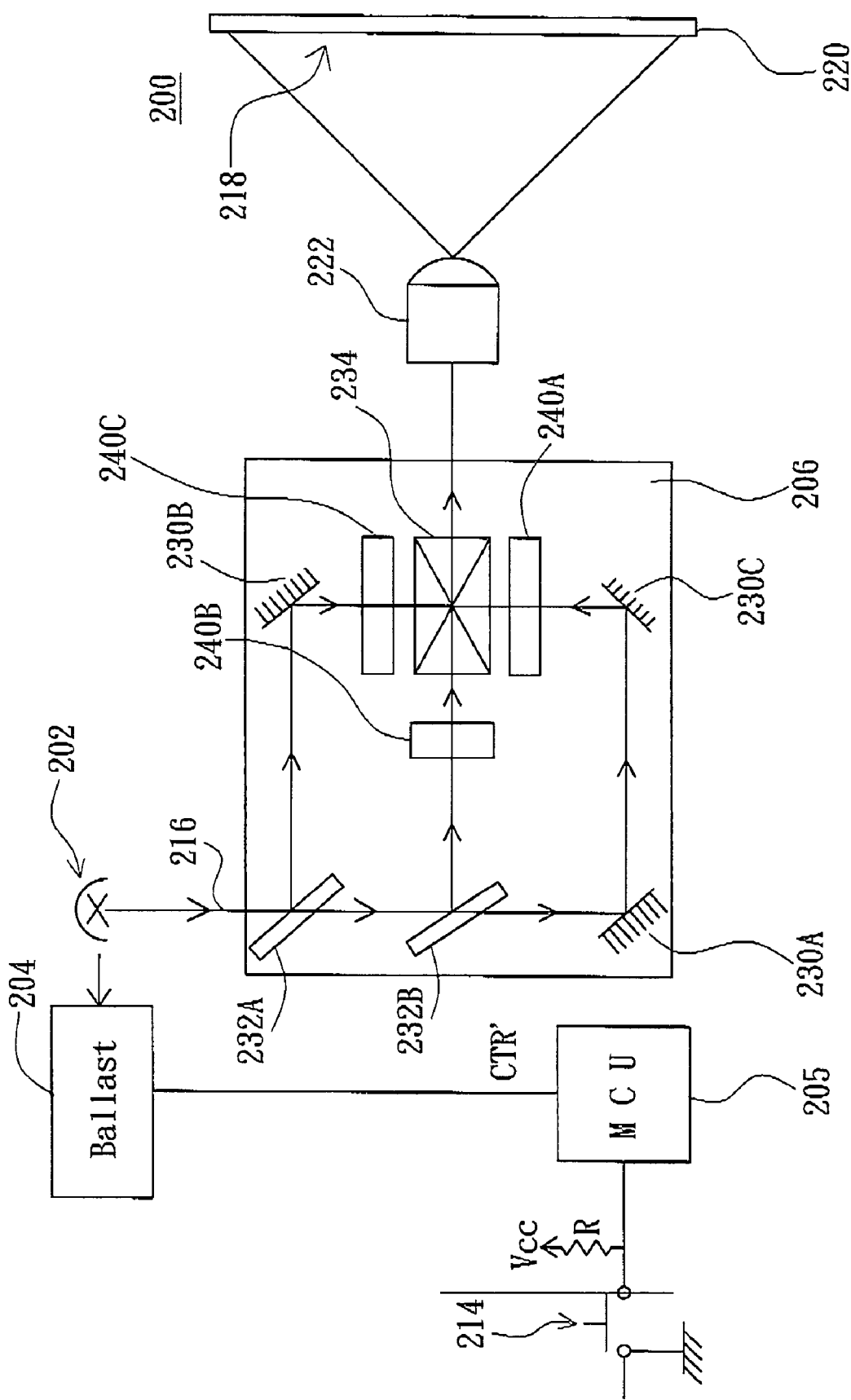
FIG. 2 is a system architecture diagram showing a LCD projector according to a second embodiment of the invention.

FIG. 2 is a system architecture diagram showing a LCD projector according to a second embodiment of the invention. The LCD projector 200 includes a lamp 202, a ballast 204, a micro controller unit 205, an optical engine 206, a switch 214 and a lens 222. The optical engine 206 includes a red LCD (liquid crystal display) panel 240A, a blue LCD panel 240B, a green LCD panel 240C, at least one reflecting mirror, a beam splitter, and a beam combiner, such as reflecting mirrors 230A, 230B and 230C, polarization beam splitters 232A and 232B, and an X-cube 234, respectively.

In the normal mode, the power supplied from the ballast 204 to the lamp 202 is the operating power. The light ray 216 emitted from the lamp 202 is incident to the polarization beam splitter 232A, which splits the light ray 216 into two light rays incident to the polarization beam splitter 232B and the reflecting mirror 230B, respectively. The light rays split by the polarization beam splitter 232B are incident to the blue LCD panel 240B and the reflecting mirror 230A, respectively. The reflecting mirror 230A reflects the light ray to the reflecting mirror 230C, which reflects the light ray to the red LCD panel 240A. The light ray reflected from the reflecting mirror 230B is incident to the green LCD panel 240C. Three primary-color light rays including red, green, and blue light rays may be obtained after the light ray 216 is split by the polarization beam splitters 232A and 232B. The three primary-color light rays are processed by the red LCD panel 240A, the blue LCD panel 240B, and the green LCD panel 240C, and are then incident to the X-cube 234, which combines the three primary-color light rays. The combined light ray is then incident to the lens 222, and a projecting image 218 on a screen 220 may be obtained.

There are many methods for triggering the LCD projector of this embodiment to enter the blanking mode. In this embodiment, a micro controller unit 205 triggered by a switch 214 is described as an example. After the user has pressed the switch 214, the ground signal is input to the micro controller unit 205, and the micro controller unit 205 is triggered. The triggered micro controller unit 205 makes the LCD projector 200 enter the blanking mode, and outputs a control signal CTR' to the ballast 204. The power supplied from the ballast 204 to the lamp 202 is changed from the operating power to the lower blanking power.

In this embodiment, when the LCD projector 200 enters the blanking mode, the three primary-color light rays incident to the red LCD panel 240A, the blue LCD panel 240B and the green LCD panel 240C are blocked by the polarizer in the display panel. In the LCD projector 200 of this invention, the power output from the lamp 202 in the blanking mode is lower than that in the normal mode. So, the optical energy blocked by the polarizer in this embodiment is smaller than that in the conventional LCD projector. Consequently, compared to the conventional projector, the LCD projector of this embodiment is free from the condition of overheating, and the energy may be advantageously saved.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A projector, comprising:
   a lamp for emitting a light ray;
   a ballast for staffing the lamp and selectively supplying an operating power and a blanking power to the lamp;
   a micro controller unit for controlling the ballast; and
   an optical engine for receiving the light ray and outputting a projecting image to a screen outside the projector, wherein when the projector enters a blanking mode from a normal operating mode, the micro controller unit outputs a control signal to the ballast, and a power supplied from the ballast to the lamp switched from the operating power to the blanking power;
   wherein the projector is a digital light processing (DLP) projector, the optical engine comprises a digital micro-mirror device (DMD), when the projector is in a normal mode, the light ray emitted from the lamp is reflected by the DMD and projected onto the screen, and when the projector enters the blanking mode, the DMD reflects the light ray from the lamp to an inner wall of the optical engine.

2. The projector according to claim 1, wherein the optical engine further comprises:
   a reflecting mirror;
   a color wheel for generating at least three primary-color light rays after the light ray emitted from the lamp passes through the color wheel; and
   a light pipe for conducting the three primary-color light rays to the reflecting mirror, which reflects the three primary-color light rays to the DMD, respectively.

3. A digital light processing (DLP) projector, comprising:
   a switch;
   a lamp for emitting a light ray;
   a ballast for starting the lamp and supplying a power to the lamp;
   a micro controller unit coupled to the switch to control the ballast; and
   an optical engine for receiving the light ray and outputting a projecting image to a screen outside the projector, wherein:
   the optical engine comprises a digital micro-mirror device (DMD);
   the light ray emitted from the lamp is incident to the DMD;
   when the projector is in a normal mode, the light ray is reflected by the DMD and projected onto the screen;
   when the switch is triggered, the projector enters a blanking mode, and the DMD reflects the light ray to an inner wall of the optical engine; and
   the ballast reduces the output power of the lamp.

4. The projector according to claim 3, wherein the micro controller unit has an input pin, the switch has a first terminal and a second terminal, the input pin is coupled to a first terminal of a resistor, a second terminal of the resistor is coupled to a first level, the first terminal of the switch is coupled to the input pin, the second terminal of the switch is coupled to a second level, and when the switch is triggered, the first terminal of the switch is electrically connected to the second terminal of the switch.

5. The projector according to claim 3, wherein the optical engine further comprises:
   a color wheel for generating at least three primary-color light rays after the light ray emitted from the lamp passes through the color wheel; and
   a light pipe for conducting the three primary-color light rays to the DMD, respectively.

6. The projector according to claim 3, further comprising:
   an analog-to-digital converter for converting an analog image signal into a digital image signal;
   a scaling circuit for processing the digital image signal to make the digital image signal satisfy an image resolution of the projector; and
   a DMD driver for receiving the digital image signal processed by the scaling circuit and controlling the DMD according to the digital image signal.

* * * * *